No. 867,627. PATENTED OCT. 8, 1907.
E. C. WILCOX.
INDUCTION COIL APPARATUS.
APPLICATION FILED JUNE 19, 1907.

Witnesses
Inventor
Ernest C. Wilcox
By his Attorney

UNITED STATES PATENT OFFICE.

ERNEST C. WILCOX, OF MERIDEN, CONNECTICUT, ASSIGNOR TO THE CONNECTICUT TELEPHONE AND ELECTRIC COMPANY, INCORPORATED, A CONNECTICUT CORPORATION.

INDUCTION-COIL APPARATUS.

No. 867,627.      Specification of Letters Patent.      Patented Oct. 8, 1907.

Application filed June 19, 1907. Serial No. 379,731.

*To all whom it may concern:*

Be it known that I, ERNEST C. WILCOX, a citizen of the United States, residing at Meriden, county of New Haven, State of Connecticut, have invented certain new and useful Improvements in Induction-Coil Apparatus, of which the following is a full, clear, and exact description.

My invention relates to induction coil apparatus and particularly for ignition systems for internal combustion motors.

The object is to facilitate the adjustment of the vibrator so as to maintain the correct normal current consumption.

To accomplish the best results it is wise to proportion the coils of the transformer to the shunted condenser at a predetermined current consumption. Any variation in the system which alters the current consumption interferes with the proper operation. In adjusting the apparatus of my invention the circuit through the vibrator is first established and then broken by retracting the contact screw. The screw is then let down or tightened slowly until the circuit through the vibrator is barely established. The position of the adjusting contact screw at this time may be called the "zero" position. From this "zero" position the screw is turned until the correct current consumption is attained. The head of the screw is provided with a scale calibrated properly according to experiment, so that, for instance, each scale division indicates a current consumption of one ampere. Two amperes, which may be considered a good normal, will flow when the screw is turned two points from the zero position (clockwise if the thread on the screw is right-handed). When the scale bears indicating numbers, it may be desirable to have a plurality of zeros so as to permit a better approximation to the proper adjustment since the resistance at different points in the system sometimes varies, so that in testing the adjustment the actual current zero will not always coincide with the marked zero of the scale.

Figure 1:
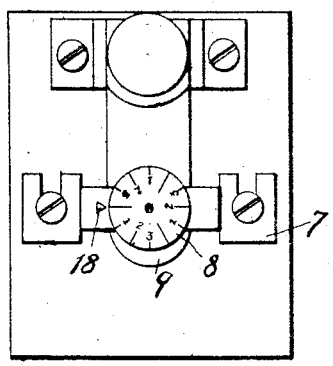
Figure 2:
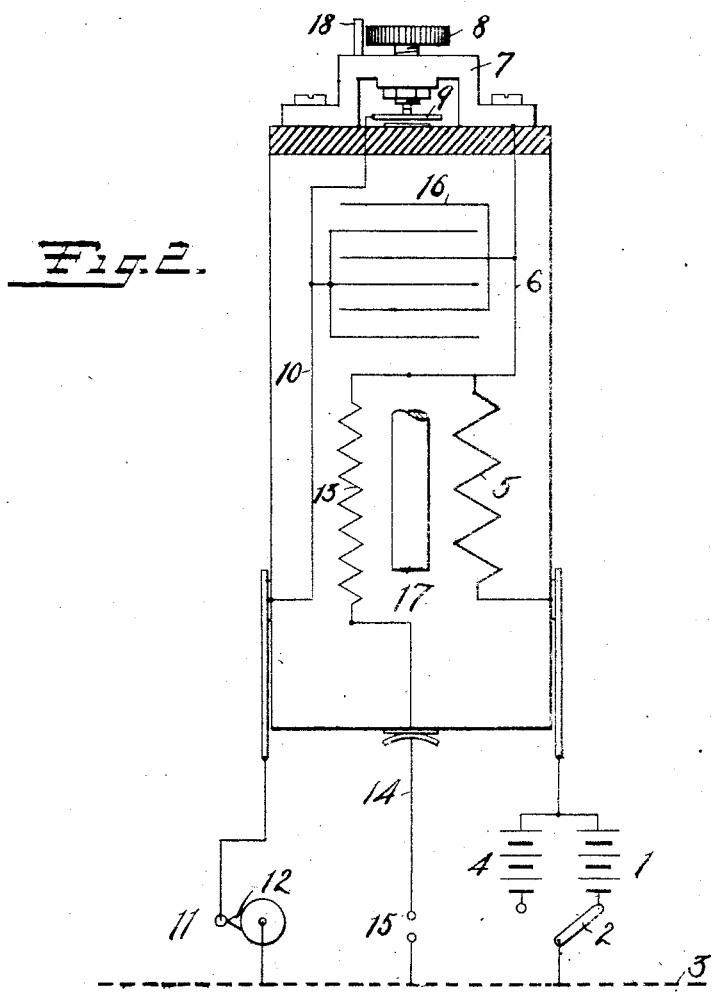

Figure 1 is a plan view of an induction coil unit of my invention. Fig. 2 is a diagrammatic side view of the same with circuit connections for an ignition system.

The source of current for instance, battery 1, is connected or grounded through switch 2 to the motor frame 3. A second battery 4 is sometimes provided and then both are connected to the primary winding 5 of the transformer, which in turn has its other terminal connected by wire 6 to bridge 7 of the vibrator device. The adjusting screw 8 contacts with the spring armature 9, which is connected through conductor 10 to contact 11, and thence through commutator 12, to ground. The secondary winding 13 is connected through conductor 14, to the spark plug or ignition device 15, which is grounded. The other secondary terminal is connected to wire 6 and thus in circuit with the vibrator and commutator. The condenser 16 is shunted across the vibrator terminals. A core 17 is usually employed.

Adjacent the head of the contact screw 8 is a stationary pin, post, pointer or index 18, which is carried by the bridge 7 and serves, in conjunction with the radial scale on the screw head, to indicate the proper position or adjustment of the vibrator contacts, as before referred to. When properly adjusted the system works at its highest efficiency, as will be appreciated by those acquainted with this art.

What I claim is:—

1. In an ignition system, the combination of an ignition device, a source of primary current, an induction device having its primary in circuit with the source of current and having its secondary in circuit with the ignition device, a vibrator in the primary circuit and having an adjustable member, a condenser shunted across the terminals of the vibrator and proportioned to the normal current consumption, and means for indicating the correct adjustment of the vibrator at the normal current consumption.

2. An induction apparatus, comprising a box, primary and secondary windings therein, a bridge, a stationary pointer, an adjustable member carried by said bridge and having a plurality of indicating marks adapted to register with said pointer for indicating the correct adjustment for normal conditions.

3. As an article of manufacture, a bridge member for an induction vibrator, a pointer carried thereby, and an adjustable member adjacent the pointer and having a plurality of scales from the zeros of which said member is adapted to be moved.

ERNEST C. WILCOX.

Witnesses:
V. M. KOORBMAN.
B. A. LYNES.